(12) United States Patent
Gelchinski

(10) Patent No.: US 6,416,637 B1
(45) Date of Patent: Jul. 9, 2002

(54) REACTOR FOR ELECTROLYTIC REDUCTION OF $CR^{+6}$

(75) Inventor: Mordechai Gelchinski, Ramat Gan (IL)

(73) Assignee: Israel Aircraft Industries Ltd., Ben Gurion International Airport (IL)

( * ) Notice: Subject to any disclaimer, the term of this patent is extended or adjusted under 35 U.S.C. 154(b) by 0 days.

(21) Appl. No.: 09/473,616

(22) Filed: Dec. 29, 1999

(30) Foreign Application Priority Data

Jan. 15, 1999 (IL) ................................................. 128081

(51) Int. Cl.$^7$ ................................................. C25B 9/00
(52) U.S. Cl. .................... 204/263; 204/275.1; 204/283; 204/284; 252/500
(58) Field of Search .............................. 204/263, 275.1, 204/284, 283; 205/572, 371, 483; 252/500

(56) References Cited

U.S. PATENT DOCUMENTS

| | | | |
|---|---|---|---|
| 3,629,774 A | * 12/1971 | Crites | 338/114 |
| 3,679,557 A | 7/1972 | Gilby et al. | 204/97 |
| 4,231,901 A | * 11/1980 | Berbeco | 252/511 |
| 4,256,557 A | 3/1981 | Soboroff et al. | 204/149 |
| 4,293,396 A | 10/1981 | Allen et al. | 204/106 |
| 4,436,601 A | 3/1984 | Branchick et al. | 204/149 |
| 4,647,359 A | 3/1987 | Lindstrom | 204/294 |
| 5,028,355 A | * 7/1991 | Cope et al. | 252/500 |
| 5,183,546 A | 2/1993 | Oren et al. | 204/290 |
| 5,326,439 A | 7/1994 | Brewster | 204/149 |

FOREIGN PATENT DOCUMENTS

| | | | |
|---|---|---|---|
| DE | 3538732 | | 6/1986 |
| EP | 0267704 | | 5/1988 |
| EP | 0474936 | | 3/1992 |
| FR | 2727133 | | 5/1996 |
| GB | 2078170 | * | 1/1982 |
| IL | 91346 | | 12/1995 |
| WO | 9710370 | | 3/1997 |

OTHER PUBLICATIONS

English Abstract of WO 97/10370 Dated Mar. 20, 1997.
English Abstract of FR 2727133 dated May 1996.*
English Abstract of DE 3538732 dated Jun. 1986.*
Patent Abstracts of Japan Publication No. 57115433 dated Jul. 17, 1982.*
Patent Abstracts of Japan Publication No. 59091133 dated May 25, 1984.*
Patent Abstracts of Japan JP 57 115 433 A dated Oct. 20, 1982.*
Patent Abstracts of Japan JP 59 091133 A dated Sep. 12, 1984.*
Chemical Abstracts CA 105:142120z "Manufacture of an electrode for electrochemical cells for hydrogen peroxide and hydrogen production." 72–Electrochemistry, vol. 105, p. 545, (1986).
Chemical Abstracts CA 117:75805j "Electrochemical process for purifying chromium containing wastes." vol. 117, (1992).
Chemical Abstracts CA 125:91928x "Electrochemical metal recovery from waste solutions." 54–Extractive Metallurgy, vol. 125, No. 8, p. 379, (1996).
Chemical Abstracts CA 126:244076r "Electrolytic stacked–plate cell." Electrochemistry, vol. 126, No. 18, p. 1110, (1997).

* cited by examiner

*Primary Examiner*—Bruce F. Bell
(74) *Attorney, Agent, or Firm*—Ladas & Parry

(57) ABSTRACT

The invention provides a dynamic electrolytic reactor for the reduction of $Cr^{+6}$ to $Cr^{+3}$ in aqueous solution. The reactor comprises at least one pair of liquid permeable anode and cathode connectable to an electric current supply. The cathode according to the invention is three-dimensional, and comprises a substrate of flexible porous material whose inner and outer surfaces are coated with an electrically conductive carbon black powder embedded in a binder.

6 Claims, 4 Drawing Sheets

REACTOR FOR ELECTROLYTIC REDUCTION OF $CR^{+6}$

FIELD OF THE INVENTION

The present invention concerns the detoxication of aqueous solutions contaminated with hexavalent chromium by electrolytic reduction to trivalent chromium.

BACKGROUND OF THE INVENTION AND PRIOR ART

Various industrial operations such as electroplating, generate waste solutions containing significant amounts of hexavalent chromium ($Cr^{+6}$). $Cr^{+6}$ is known to be carcinogenic, and highly toxic to humans, animals and plants and it is therefore of paramount importance to ensure that no $Cr^{+6}$ penetrates into the soil and ground water. According to current standards, industrial aqueous waste solutions discharged into the ground or the sea may not contain more than 0.1 mg/liter of $Cr^{+6}$.

U.S. Pat. No. 3,679,557 describes an electrolytic reactor for continuously reducing $Cr^{+6}$ in aqueous solution to $Cr^{+3}$, in which the cathode is in form of a bed of carbon particles. The operation of this reactor is very slow and according to one typical example it took 208 hours to treat 300 liters of a solution for reducing its $Cr^{+6}$ content from 13.5 ppm to 0.05 ppm.

U.S. Pat. No. 4,436,601 describes an electrolytic reactor for the removal of metals from aqueous solutions comprising a plurality of electrically energized anodes and cathodes with each anode having openings to permit passage of the waste water to be electrolyzed, each cathode being in the form of a metalized reticulate organic polymer foam. The metal used for the metalization of the cathodes must be inert under the reaction conditions and copper, nickel, silver and gold are mentioned specifically. In the course of operation, the metals to be removed are precipitated on the cathodes and in consequence the cathodes have only a limited lifetime. The reduction of $Cr^{+6}$ to $Cr^{+3}$ is not mentioned specifically in the disclosure.

U.S. Pat. No. 5,326,439 discloses a method for the removal of $Cr^{+6}$ from ground water by a chemical reaction with $Fe(OH)_2$ inside an aquifer. In accordance with the disclosure an electrolytic reactor containing iron electrodes generates an aqueous suspension of ferrous hydroxide which is flown into the ground water where the reaction takes place leading to the precipitation of $Cr(OH)_3$ and possibly other matter. The so treated ground water is withdrawn from its aquifer and all precipitated matter is filtered off.

GENERAL DESCRIPTION OF THE INVENTION

It is the object of the present invention to provide a new electrolytic reactor for the effective and efficient reduction of $Cr^{+6}$ to $Cr^{+3}$ in aqueous solution.

It is a further object of the present invention to provide electrode means for use in an electrolytic reactor and a method for the production of such electrode means.

The electrolytic reactor with which the present invention is concerned is of the throughflow type in which the aqueous solution to be treated flows continuously across a reactor and the electrolytic treatment occurs in the course of such throughflow. Such a type of reactor will be referred to hereinafter for short as "dynamic electrolytic reactor".

In accordance with the present invention there is provided a dynamic electrolytic reactor for the reduction of $Cr^{+6}$ to $Cr^{+3}$ in an aqueous solution comprising a vessel with liquid inlet and outlet and holding inside at least one pair of liquid permeable anode and cathode connectable each to an electric current supply, characterized in that said cathode is three-dimensional and comprises a substrate of flexible porous material whose inner and outer surfaces are coated with an electrically conductive carbon black powder embedded in a binder.

The cathode in an electrolytic reactor according to the invention may be a single block or consists of several juxtaposed layers.

The liquid permeable anode in a reactor according to the invention may, for example, be in form of wire net or a plate having a plurality of holes.

The substrate of the flexible cathode in a dynamic electrolytic reactor according to the invention may, for example be of a synthetic material of the reticulated foam type. Due to the flexibility of the substrate, it is possible to manufacture large bodies of cathode material and cut them to size. As the flexible material is readily adaptable to the inner shape of the reactor there is no need for a very high degree of precision when cutting the cathode to size.

The invention further provides a composite material for making therefrom cathodes for reactors according to the invention which body comprises a flexible porous substrate whose outer and inner surfaces are coated with electrically conductive carbon black powder embedded in a binder. For assembling dynamic electrolytic reactors according to the invention cathode bodies of required size are cut out from the said composite.

The porosity of the porous material used for the purpose of the present invention is preferably within the range from about 5 to about 20 pores per lineal inch (ppi) according to the Mil-B-830548 standard and determined by Air Pressure Drop Test. If the porosity exceeds significantly 20 ppi the individual pores will be too small and offer too large a resistance to the through flowing aqueous solution.

Typical examples of porous materials usable as substrates for the purposes of the present invention are reticulated polyurethane foams such as SAFOM® or BULPREN® both manufactured by Reticel, Belgium.

The electrically conductive carbon black powder suitable for the purpose of the present invention is commercially available and may, for example, be that sold under the tradename Printex L™ by Degussa, Germany.

For the preparation of a composite body according to the invention a coating mixture is prepared by mixing electrically conductive carbon black powder, a binder and a solvent, and preferably milling the resulting liquid mixture, e.g. in a ball mill. The resulting coating mixture is pored into a plating bath and a body of flexible synthetic porous material (reticulated foam) is dipped into the coating mixture until fully wetted therewith. The fully wetted porous material is squeezed to remove excess liquid and is then dried. If desired, the coating operation may be repeated twice or more in order to achieve a desired electrical conductivity.

BRIEF DESCRIPTION OF THE FIGURES

For better understanding, the invention will now be described with reference to the annexed drawings in which.

DESCRIPTION OF SPECIFIC EMBODIMENTS

Figure 1:
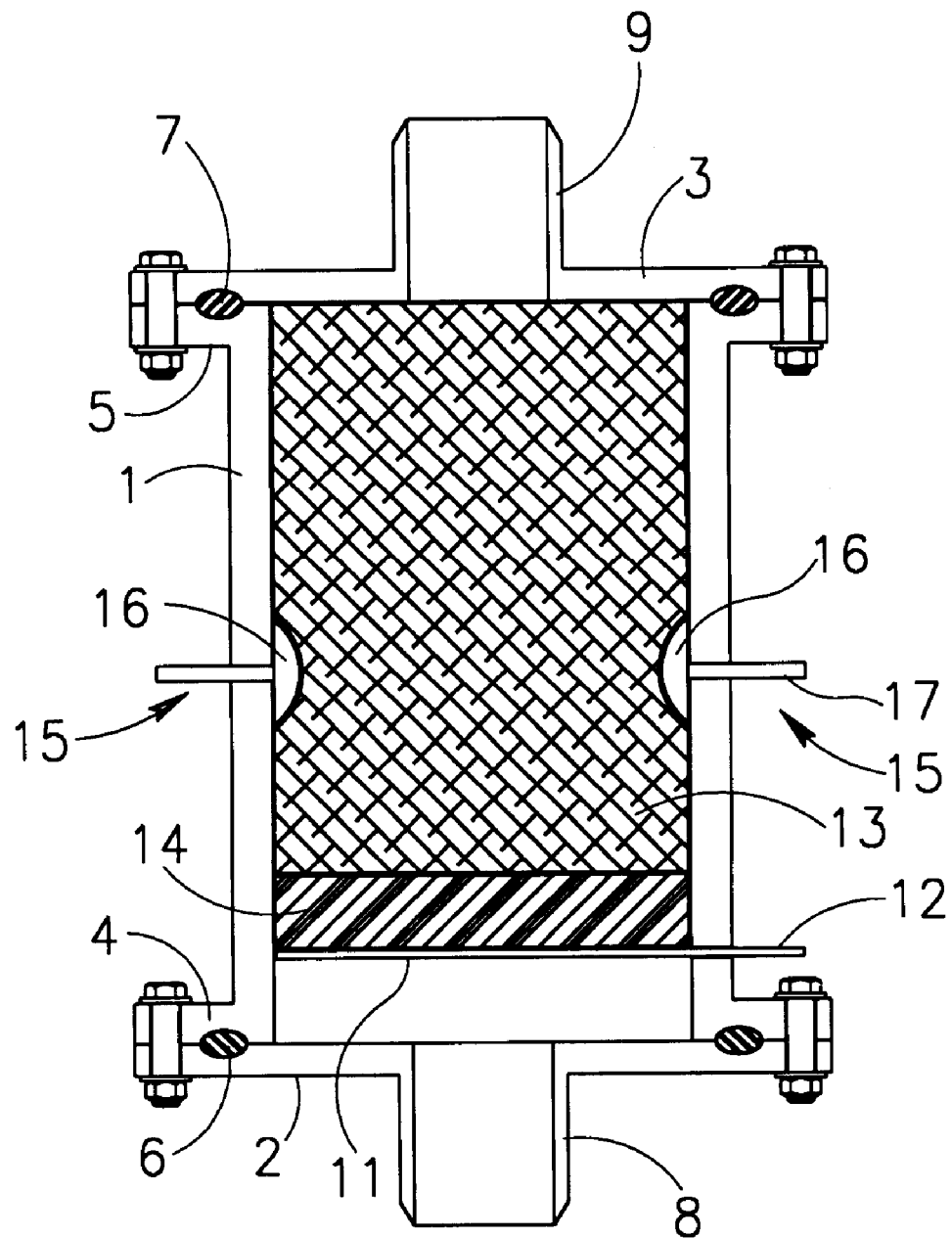
FIG. 1 is a schematic illustration of one embodiment of a dynamic electrolytic reactor according to the invention with a single cathode/anode pair.

Attention is first directed to FIG. 1, which shows one embodiment of a dynamic electrolytic reactor according to the invention. As shown, the reactor comprises a vessel 1 with bottom and top plates 2 and 3 screw-tightened to respectively annular flanges 4 and 5 with the interposition of, respectively, O-rings 6 and 7. Bottom plate 2 is fitted with a tubular inlet 8 and top plate 3 with a tubular outlet 9.

Vessel 1 holds a liquid permeable anode 11 having a terminal 12 for connection to the positive pole of a d.c. electric power supply (not shown) and a three-dimensional cathode body 13. The anode and cathode are kept apart by a non-conductive liquid permeable spacer body 14 having a plurality of through-going bores for the free passage of the electrolyzed water.

Body 1 comprises a pair of terminals 15 associated with cathode 13, each comprising a graphite-made spherical head 16 and a copper leg portion 17 connected to it by conductive glue for connection to the negative pole of a d.c. electric power supply.

In operation, terminals 12 and 17 are connected to, respectively, the positive and negative poles of a d.c. electric power supply. An aqueous solution to be electrolyzed is continuously introduced via tubular inlet 8 and the electrolyzed product solution is continually withdrawn via tubular outlet 9.

The three-dimensional cathode 13 is made of foamed synthetic material coated throughout by electrically conductive carbon black powder embedded in a binder material, e.g. a synthetic resin. Body 13 may be in a form of a single block or alternatively, made of a plurality of overlying cylindrical disks. In accordance with one preferred, but not limiting, embodiment the cathode is cylindrical, with height of about 100 mm, diameter of about 230 mm, and thus a total volume of about 4.15 liter.

Figure 2:
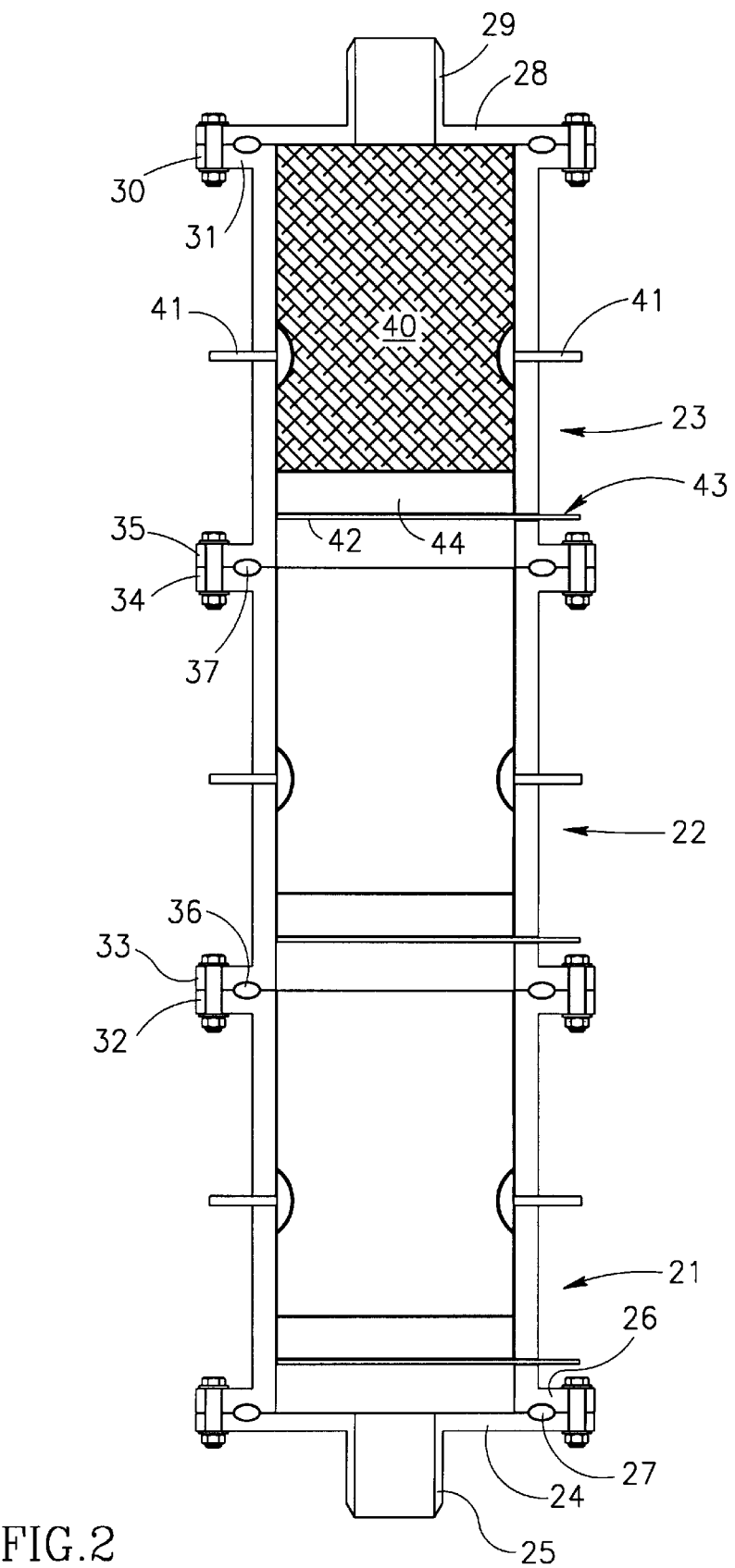
FIG. 2 is a schematic illustration of another embodiment of a dynamic electrolytic reactor according to the invention with three cathode/anode pairs.

Turning now to FIG. 2, there is shown a dynamic electrolysis electrode reactor according to the invention, having three compartments 21, 22 and 23 each being of similar interior design as the reactor of FIG. 1. The lowermost compartment 21 has a bottom plate 24 fitted with a tubular inlet 25 and screw-tightened to an annular flange 26 within the interposition of an O-ring 27. Likewise, the uppermost compartment 23 has a top plate 28 fitted with a tubular outlet 29 and screw-tightened to an annular flange 30 with the inter-position of an O-ring 31.

The median compartment 22 is connected to the two flanking compartments 21 and 23 by screw-tightening of matching pairs of annular flanges 32, 33 and 34, 35 with the interposition of, respectively, O-rings 36 and 37.

The interior of each compartment 21, 22 and 23 is similar to that of the single compartment electrolysis reactor of FIG. 1 and it includes a three-dimensional cathode 40 of the kind specified associated with terminals 41; a liquid permeable anode 42 with terminal 43 and a liquid permeable spacer 44 made of non-conductive material.

In operation, aqueous solution contaminated with $Cr^{+6}$ is introduced through the tubular inlet 25 and product solution is withdrawn through tubular outlet 29.

Figure 3:
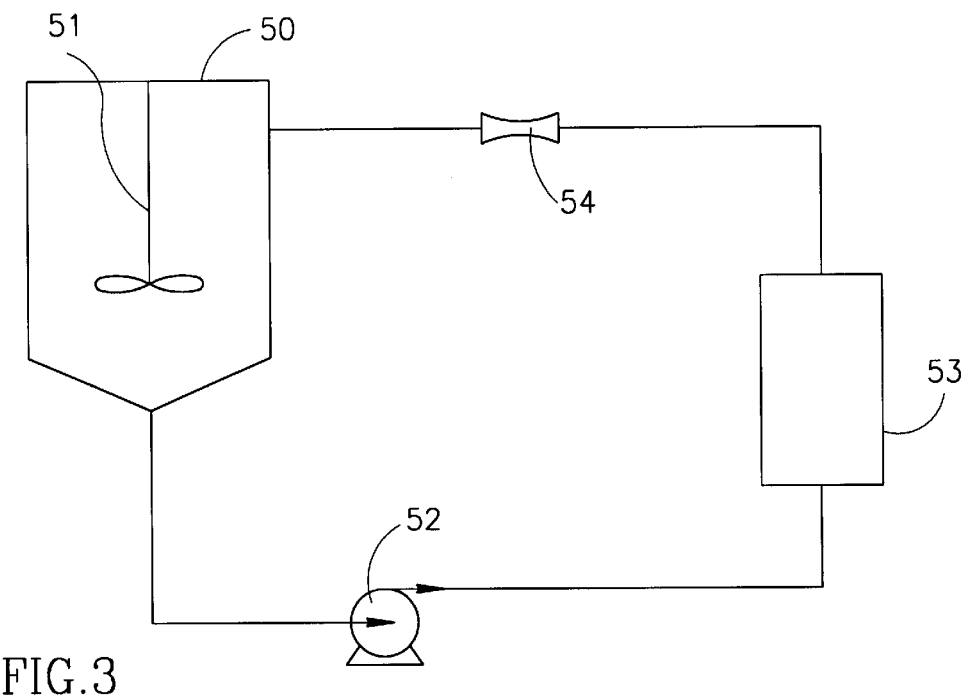
FIG. 3 is a diagrammatic illustration of a closed cycle system in which a dynamic electrolytic reactor according to the invention is used in a batch mode, having a reactor of the kind shown in FIG. 1.

Turning now to FIG. 3 there is shown diagrammatically an installation for the electrolytic reduction of $Cr^{+6}$ to $Cr^{+3}$, embodying a dynamic electrolytic reactor according to the invention and operating by the batch mode. As shown, the installation comprises a liquid storage tank 50 fitted with a stirrer 51, a pump 52, a dynamic electrolytic reactor according to the invention 53 (which may, for example, that illustrated in FIG. 1 or 2), and a flow meter 54. In operation, the tank 50 is loaded with an aqueous solution containing $Cr^{+6}$, a d.c. power supply to the reactor 53 is switched on, the pump 52 is put into operation whereby solution circulates continuously in a closed cycle from tank 50 via pump 52, reactor 53 and flow meter 54 back into tank 50, and at the end of the operation, practically all of $Cr^{+6}$ is converted into $Cr^{+3}$.

Figure 4:
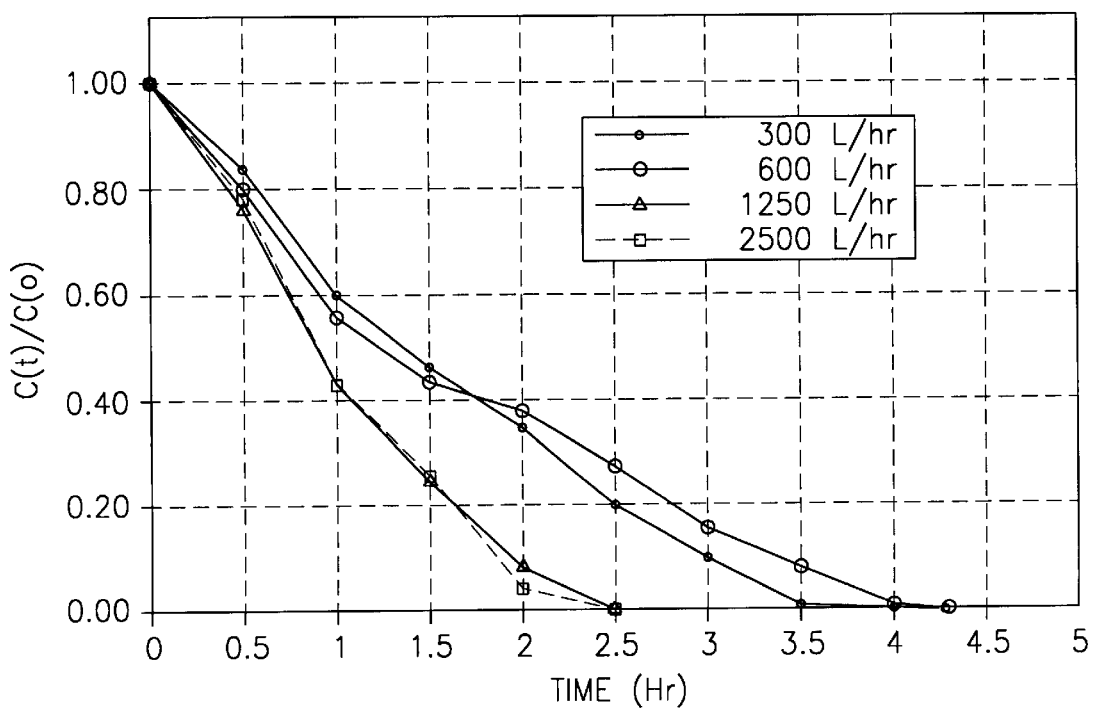
FIG. 4 is a graphical representation showing the decrease of $Cr^{+6}$ with time in the operation of a batch mode system of the kind shown in FIG. 3, having a reactor of the kind shown in FIG. 2 in four different flow rates.

FIG. 4 shows the rate of reduction of a solution having an initial $Cr^{+6}$ concentration of 30 mg/liter, in an installation according reactor 53 is of the kind shown in FIG. 2, but having 4 compartments, each including a 4.15 liter cathode, with the application of a d.c. power of 20 volt. The rate of flow, as measured by flow meter 54, was 300, 600, 1250, and 2500 liter/hour, and the rate of reduction of $Cr^{+6}$ is shown for each of those rates. As shown, after operating in the high flow rates (1250 and 2500 liter/hour) for two and a half hours the reactor totally reduced the $Cr^{+6}$ and brought its concentration practically down to 0.

Figure 5:
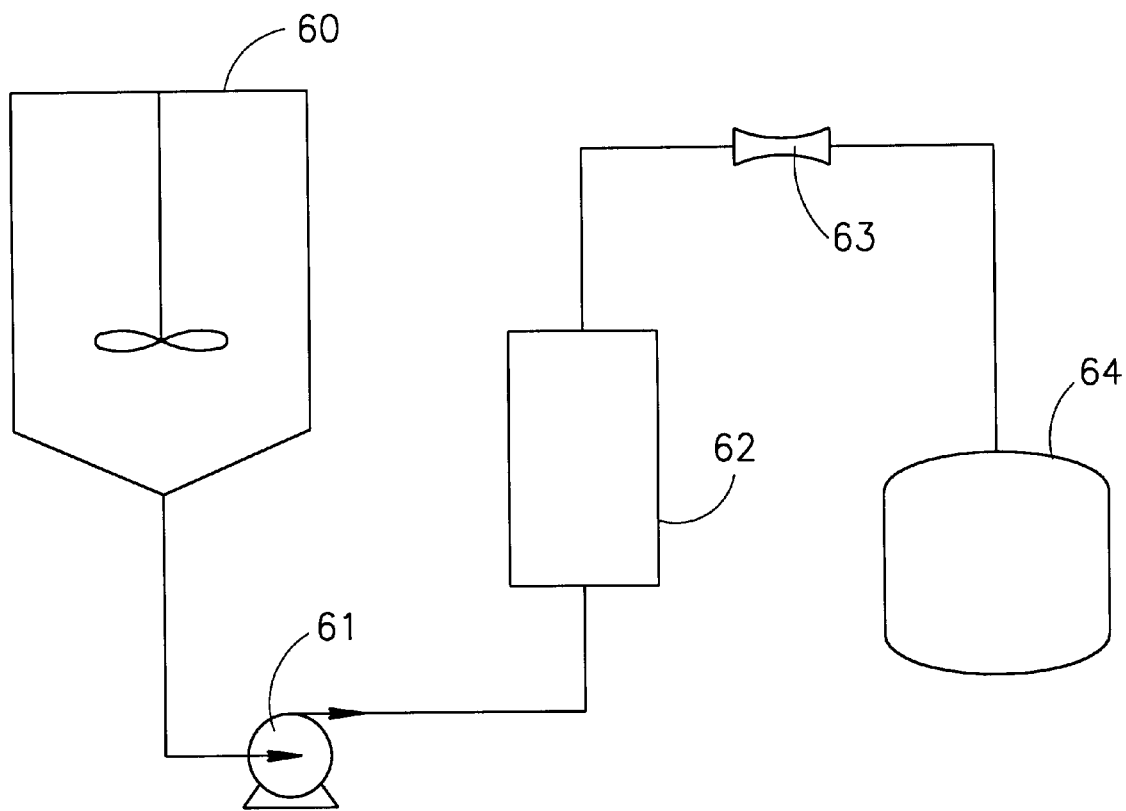
FIG. 5 is a schematic illustration of a system embodying a dynamic electrolytic reactor according to the invention operating in open cycle by a single-pass mode.

Turning now to FIG. 5, there is shown schematically an installation for the electrolytic reduction of $Cr^{+6}$ to $Cr^{+3}$ operating by the open cycle once-through mode and embodying a dynamic electrolytic reactor according to the invention. As shown, the installation comprises a feed tank 60 for the starting solution, a pump 61, a dynamic electrolytic reactor according to the invention 62, a flow meter 63 and a vessel 64 for collecting the product solution.

In operation, the starting solution with $Cr^{+6}$ is loaded into the feed tank 60 and the product solution is collected in vessel 64.

Description of the Preparation of a Cathode According to the Invention

1. Preparation of the Conductive Coating Composition 4.5 Kg of a chloroprene resin, 1.44 kg of conductive carbon black powder Printex L™ obtained from Degussa, Germany and 7 liters of xylene were mixed for one hour in a 20 liter vessel following which 60 grams of "MODA-FLOW®" resin modifier manufactured by Monsanto, in 1 liter of xylene was added, and stirring was continued for about 3 hours.

After completion of the mixing, the liquid was introduced into a ball mill of the horizontal mill type and subjected to milling for 2 to 3 hours. The degree of comination was determined by a Hegman test according to ASTM Standard D1210-79, which determines the degree of cominution by measuring the particle size. The milled product is further diluted with xylene until a viscosity of 200–230 CPS is reached.

2. Preparation of the Cathode

A 20 mm thick reticulated2 polyurethane foam having a porosity of 10 ppi was used as substrate. A plating bath fitted with a pneumatic squeezing device was filled with a milled paint solution prepared as described under 1 above. The foamed porous polyurethane body was fully immersed in the solution and kept there until it was fully wetted by the solution. The body was then withdrawn, squeezed to remove excess liquid and dried in an oven for half an hour at 60° C.

The electric resistance of the so produced coat was determined to be 250–350 Ω/□ by means of a probe according to standard ASTM D257.

The above coating operation was repeated another four times and at the end, the aggregate coat had a resistance of 20–40 Ω/□.

From the electrode material so obtained, individual electrode bodies may be cut out to fit into electrolytic reactors of the kind shown in FIGS. 1 and 2.

What is claimed is:

1. A dynamic electrolytic reactor for the reduction of $Cr^{+6}$ to $Cr^{+3}$ in an aqueous solution comprising a vessel with liquid inlet and outlet and holding inside at least one pair of liquid permeable anode and cathode connectable to an electric current supply, characterized in that said cathode is three-dimensional and comprises a substrate of flexible porous material whose inner and outer surfaces are coated with an electrically conductive carbon black powder embedded in a binder.

2. A dynamic electrolytic reactor according to claim 1, wherein the cathode is single-block.

3. A dynamic electrolytic reactor according to any one of claim 2, wherein the cathode has a porosity of from about 5 to about 20 pores per inch.

4. A dynamic electrolytic reactor according to claim 1, wherein the cathode comprises a plurality of juxtaposed layers.

5. A dynamic electrolytic reactor according to any one of claim 4, wherein the cathode has a porosity of from about 5 to about 20 pores per inch.

6. A dynamic electrolytic reactor according to any one of claim 1, wherein the cathode has a porosity of from about 5 to about 20 pores per inch.

* * * * *